United States Patent
Kurimoto et al.

(10) Patent No.: US 10,195,814 B2
(45) Date of Patent: Feb. 5, 2019

(54) HONEYCOMB STRUCTURE

(71) Applicant: NGK INSULATORS, LTD., Nagoya (JP)

(72) Inventors: Yudai Kurimoto, Nagoya (JP); Hirotaka Yamamoto, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 134 days.

(21) Appl. No.: 15/461,814

(22) Filed: Mar. 17, 2017

(65) Prior Publication Data
US 2017/0274618 A1    Sep. 28, 2017

(30) Foreign Application Priority Data
Mar. 25, 2016 (JP) ................. 2016-062755

(51) Int. Cl.
| | |
|---|---|
| *B32B 3/12* | (2006.01) |
| *B01D 9/00* | (2006.01) |
| *B01J 29/00* | (2006.01) |
| *B01J 23/00* | (2006.01) |
| *B01D 69/04* | (2006.01) |

(52) U.S. Cl.
CPC ............. *B32B 3/12* (2013.01); *B01D 69/04* (2013.01); *B01J 23/00* (2013.01); *B32B 2309/105* (2013.01)

(58) Field of Classification Search
CPC ......... B01D 69/00; B01D 69/04; B01L 23/00; B01L 29/00; B32B 3/12
See application file for complete search history.

(56) References Cited

U.S. PATENT DOCUMENTS

| | | | | |
|---|---|---|---|---|
| 5,629,067 | A  * | 5/1997 | Kotani ............... | C04B 41/009 |
| | | | | 422/177 |
| 9,188,040 | B2 * | 11/2015 | Kaneda .................. | B01J 35/04 |
| 2010/0119719 | A1 * | 5/2010 | Kono ..................... | B01J 35/04 |
| | | | | 427/372.2 |
| 2012/0093695 | A1 | 4/2012 | Iwakura et al. | |

FOREIGN PATENT DOCUMENTS

JP        2012-102004 A1    5/2012

* cited by examiner

*Primary Examiner* — Mark Kopec
(74) *Attorney, Agent, or Firm* — Burr & Brown, PLLC

(57) ABSTRACT

A honeycomb structure includes a honeycomb structure body that includes a porous partition wall which defines a plurality of cells serving as through channels of fluid and extending from an inflow end face as one end face to an outflow end face as the other end face, and a circumferential wall arranged on a circumferential surface of the honeycomb structure body. The circumferential wall has a thickness of 0.5 to 4.0 mm, a gap path is formed along a surface of the circumferential wall inside the circumferential wall, the gap path has a width of 0.4 to 4.0 mm, and has a height of 50 to 99% of the thickness of the circumferential wall, and a total length of the gap path is 1000% or more of a length in the cell extending direction of the honeycomb structure body.

2 Claims, 2 Drawing Sheets

HONEYCOMB STRUCTURE

The present application is an application based on JP 2016-062755 filed on Mar. 25, 2016 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure in which a crack is hardly generated and isostatic strength is maintained.

Description of the Related Art

Currently, as NOx control of diesel cars and trucks in developed countries, further stringent conditions have been studied. As a catalyst for treating NOx, an SCR (Selective Catalytic Reduction) catalyst has been generally used, and practically, a honeycomb structure obtained by loading an SCR catalyst (specifically, zeolite or the like) onto a honeycomb-shaped substrate has been known.

Moreover, as the honeycomb structure described above, one applied with a circumferential coating layer (circumferential wall) has been known (see Patent Document 1).

[Patent Document 1] JP-A-2012-102004

SUMMARY OF THE INVENTION

The honeycomb structure described in Patent Document 1 has a problem that a crack is generated in the calcination of a catalyst. Particularly, a honeycomb structure with a high porosity and a honeycomb structure with a thin partition wall have a low strength. Therefore, when the circumferential coating layer becomes high temperature (for example, in the calcination of a catalyst), a partition wall constituting the honeycomb structure cannot withstand stress generated by thermal expansion of the circumferential coating layer, and a crack may be generated in the honeycomb structure.

The present invention is made in view of the above-described problem. The present invention provides a honeycomb structure in which a crack is hardly generated and isostatic strength is maintained.

[1] A honeycomb structure including: a honeycomb structure body that includes a porous partition wall which defines a plurality of cells serving as through channels of fluid and extending from an inflow end face as one end face to an outflow end face as the other end face, and a circumferential wall arranged on a circumferential surface of the honeycomb structure body, wherein the circumferential wall has a thickness of 0.5 to 4.0 mm, a gap path is formed along a surface of the circumferential wall inside the circumferential wall, the gap path has a width of 0.4 to 4.0 mm, and has a height of 50 to 99% of the thickness of the circumferential wall, and a total length of the gap path is 1000% or more of a length in the cell extending direction of the honeycomb structure body.

[2] The honeycomb structure according to the item [1], wherein the circumferential wall has a thickness of 0.5 to 3.0 mm, and the gap path has a height of 80 to 99% of the thickness of the circumferential wall.

In the honeycomb structure of the present invention, since a predetermined gap path is formed inside the circumferential wall, a crack is hardly generated and isostatic strength is maintained.

DESCRIPTION OF THE PREFERRED EMBODIMENTS

Hereinbelow, the embodiments of the present invention are described in reference to the drawings. The present invention is not limited to the following embodiments. It should be understood that the following embodiments to which modifications, improvements and the like are suitably added on the basis of ordinary knowledge of a person skilled in the art without departing from the gist of the present invention also fall in the gist of the present invention.

Figure 1:
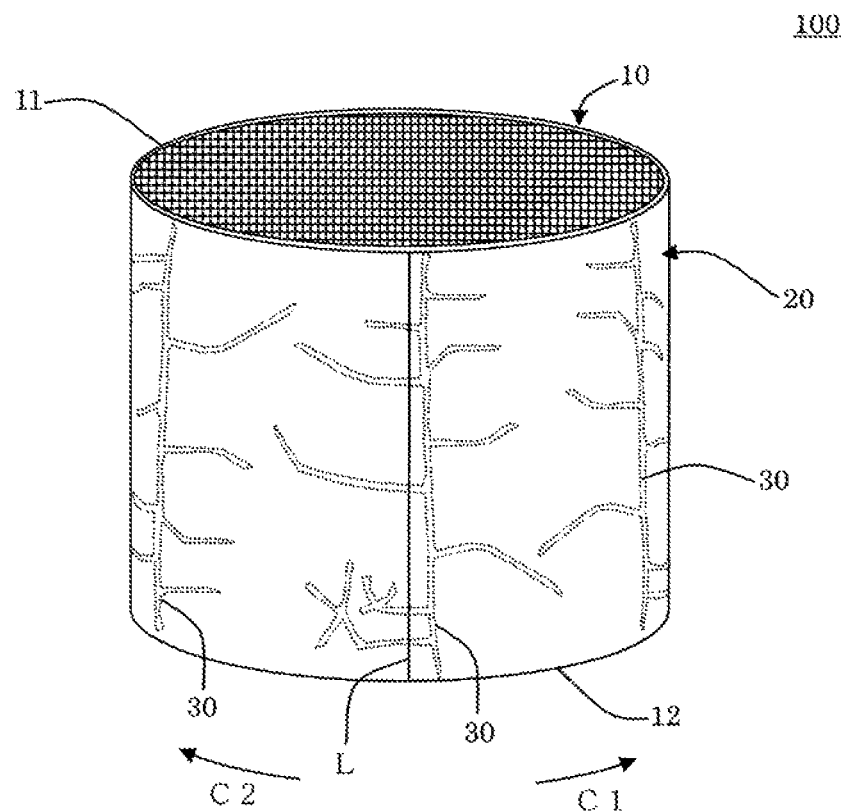
FIG. 1 is a perspective view schematically showing an embodiment of the honeycomb structure of the present invention.
Figure 2:
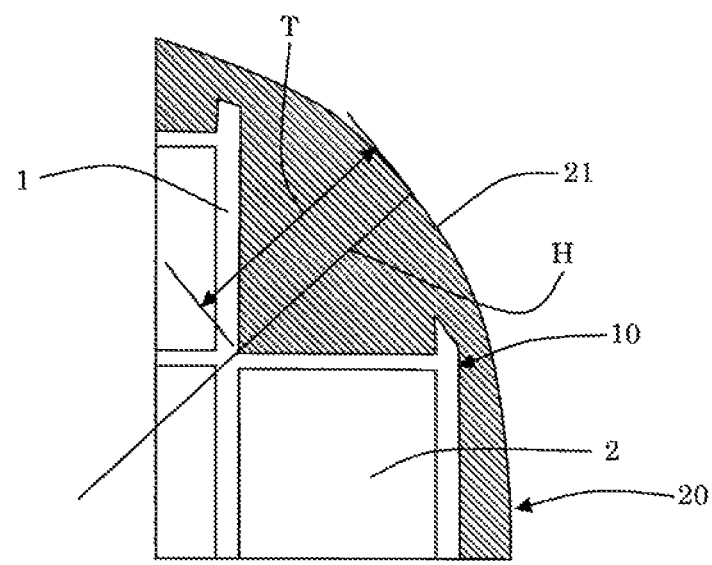
FIG. 2 is a plane view schematically showing an enlarged view of a circumferential part of an inflow end face of an embodiment of the honeycomb structure of the present invention.
Figure 3:
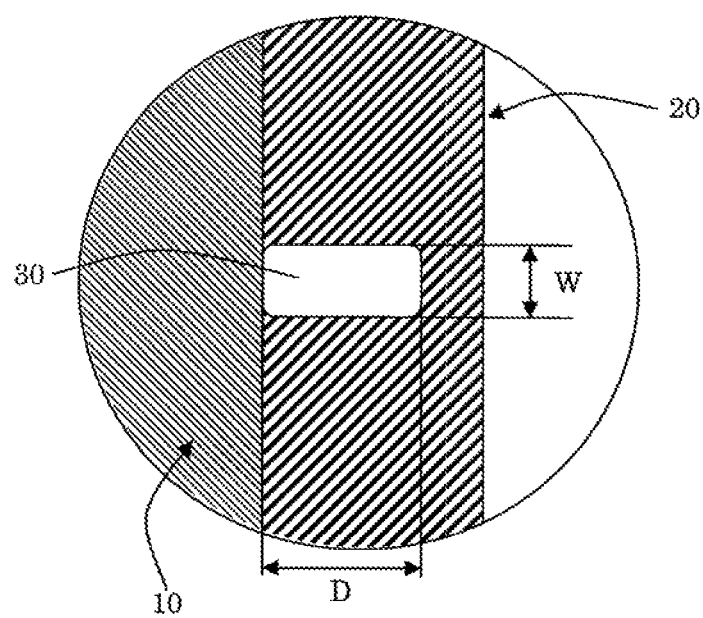
FIG. 3 is a cross-sectional view schematically showing an enlarged view of a circumferential part of a cross section perpendicular to a cell extending direction of an embodiment of the honeycomb structure of the present invention.

(1) Honeycomb Structure:

An embodiment of the honeycomb structure of the present invention is a honeycomb structure 100 as shown in FIG. 1 to FIG. 3. The honeycomb structure 100 includes a honeycomb structure body 10 that includes a porous partition wall 1 which defines a plurality of cells 2 serving as through channels of fluid and extending from an inflow end face 11 as one end face to an outflow end face 12 as the other end face. Furthermore, the honeycomb structure 100 includes a circumferential wall 20 arranged on a circumferential surface of the honeycomb structure body 10, and the circumferential wall 20 has a thickness of 0.5 to 4.0 mm. Moreover, in the honeycomb structure 100, a gap path 30 is formed along a surface of the circumferential wall 20 inside the circumferential wall 20. This gap path 30 has a width of 0.4 to 4.0 mm, and has a height of 50 to 99% of the thickness of the circumferential wall 20. Furthermore, a total length of the gap path 30 is 1000% or more of a length in the cell 2 extending direction of the honeycomb structure body 10.

In the honeycomb structure 100 described above, since the gap path 30 is formed inside the circumferential wall 20, stress at thermal expansion of the circumferential wall 20 can be released by the gap path 30. Therefore, the honeycomb structure 100 can relax thermal stress applied to the honeycomb structure body 10. As a result, generation of a crack caused by thermal stress generated when the circumferential wall 20 becomes high temperature can be suppressed. In addition, in the honeycomb structure 100, isostatic strength is maintained.

It is also considered that the stress at thermal expansion of the circumferential wall 20 is released, simply by a crack generated in the circumferential wall 20, without forming a gap path 30. However, in this case, a problem that a catalyst leaks out from the crack when loading the catalyst onto the honeycomb structure arises. In the present invention, it is not simply that a crack is formed, but a gap path is made, and thus, leak out of the catalyst from the crack when loading the catalyst onto the honeycomb structure can be prevented.

FIG. 1 is a perspective view schematically showing an embodiment of the honeycomb structure of the present invention. FIG. 2 is a plane view schematically showing an enlarged view of a circumferential part of an inflow end face of an embodiment of the honeycomb structure of the present invention. FIG. 3 is a cross-sectional view schematically showing an enlarged view of a circumferential part of a cross section perpendicular to a cell extending direction of an embodiment of the honeycomb structure of the present invention.

(1-1) Circumferential Wall:

The thickness of the circumferential wall 20 is necessary to be 0.5 to 4.0 mm, and is preferably 1.0 to 2.0 mm, and further preferably 1.4 to 1.8 mm. When the thickness of the circumferential wall 20 is less than the lower limit, the strength of the honeycomb structure is lowered, and thus, a breakage trouble occurs when storing the honeycomb structure in a can body. When the thickness exceeds the upper limit, the volume of the circumferential coating layer is increased. Thus, thermal shock resistance is lowered, and a breakage trouble of the circumferential coating layer occurs when a temperature difference occurs in the honeycomb structure.

The "thickness of the circumferential wall" herein means a thickness of the thickest part of the circumferential wall. Specifically, as shown in FIG. 2, in the cross section perpendicular to the cell extending direction of the honeycomb structure 100, a normal line H in the surface 21 of the circumferential wall 20 is drawn. Then, among the normal lines H, the length of the longest length from the surface 21 of the circumferential wall 20 to the honeycomb structure body 10 is defined as the "thickness of the circumferential wall".

A gap path is formed in the circumferential wall, and this "gap path" has a width of 0.4 to 4.0 mm, and has a height of 50 to 99% of the thickness of the circumferential wall, as described above. By forming the gap path as described above, stress at thermal expansion of the circumferential wall can be released by this gap path. As a result, generation of a crack caused by thermal stress generated when the circumferential wall becomes high temperature can be suppressed, and isostatic strength is maintained.

The width and height of the gap path inside the circumferential wall are measured as follows. First, the part of the thickness of 5% of the thickness of the circumferential wall is uniformly cut from the surface of the circumferential wall, then a groove on the surface exposed by the cutting is confirmed, and the width and height of this groove are measured. The reason why the groove is measured as described above is that the height (region) of the gap of which upper part is covered by a gap path forming step is about 5% of the thickness of the circumferential wall. That is, the part of the thickness of 5% of the thickness of the circumferential wall is uniformly cut from the surface of the circumferential wall, whereby a gap path inside the circumferential wall can be externally visually recognized as a groove. Therefore, the width and height of this groove are measured, whereby a gap path can be confirmed.

The "height of the gap path" refers to a distance in the thickness direction of the circumferential wall 20 (in FIG. 3, indicated by reference numeral "D"). The "width of the gap path" refers to a length in the direction perpendicular to the gap path 30 extending direction (in FIG. 3, indicated by reference numeral "W"). Here, the "height of the gap path" and "width of the gap path" are averages when measuring the height and width of the gap path in the predetermined position. The predetermined position is determined as follows. First, a straight line (parallel straight line) that is parallel to the partition wall extending direction in the plane view of the end face of the honeycomb structure, and that passes through the center of the end face and the edge of the end face is drawn. Then, a contact (reference point) of this parallel straight line and the edge of the end face is determined. For example, in the case of a honeycomb structure having cells with a quadrilateral cross-sectional shape (quadrilateral cell honeycomb structure), four parallel straight lines can be drawn, and there exist four reference points. Moreover, a straight line (standing straight line L (see FIG. 1)) is drawn in the cell extending direction, from this reference point toward the other end face of the honeycomb structure. Then, the width and height of the gap path (groove) positioned at "three predetermined points" (namely, in the "predetermined position") on the standing straight line are measured, and the averages of these are calculated. The height and width of the gap path are determined as described above. The "three predetermined points" on the standing straight line refer to a point on the inflow end face of the honeycomb structure, a point on the outflow end face of the honeycomb structure, and an intermediate point of the inflow end face and the outflow end face of the honeycomb structure. All of the "three predetermined points" on the standing straight line satisfy a condition that the gap path "has a width of 0.4 to 4.0 mm, and has a height of 50 to 99% of the thickness of the circumferential wall".

When a gap path does not exist on the standing straight line, in the circumferential direction, a region within 5% of the circumferential length is investigated clockwise and counterclockwise from the standing straight line, and a first intersection point of a gap path present in the region and a straight line parallel to the standing straight line in the above "three predetermined points" is determined. The investigation of an intersection point is performed in the order of counterclockwise C1 from the standing straight line (see FIG. 1) and clockwise C2 from the standing straight line (see FIG. 1).

The total length of the gap path 30 in the circumferential wall 20 is necessary to be 1000% or more of the length in the cell extending direction of the honeycomb structure body 10, and is preferably 1000 to 1500%, and further preferably 1000 to 1200%. When the total length of the gap path 30 is less than 1000% of the length in the cell extending direction of the honeycomb structure body 10, thermal shock resistance is lowered, for lack of a gap inside the circumferential wall to be a thermal stress buffer part. The total length of the gap path 30 is a value measured as follows. That is, the part of the thickness of 5% of the thickness of the circumferential wall is cut from the surface of the circumferential wall, then the total length of the gap path (groove) on the surface exposed by the cutting is measured. The value measured as described above is defined as a total length of the gap path. The total length of the gap path is measured by image analysis. In the measurement of the total length of the gap path, a recess in the surface of the cut circumferential wall is defined as a gap path (groove). As the condition of image analysis, binarization is performed so that the groove is black and other region is white. Then, the total length of the black part is calculated by image analysis.

In the honeycomb structure of the present invention, it is preferable that the circumferential wall has a thickness of 0.5 to 3.0 mm, and the gap path has a height of 80 to 99% of the thickness of the circumferential wall. By satisfying the conditions as described above, the gap path inside the circumferential wall buffers thermal stress, and thus, an ESP safe temperature rises. That is, thermal shock resistance is improved, and thus, the honeycomb structure can be maintained without being broken even when a temperature difference occurs. The "ESP safe temperature" refers to an index indicating thermal shock resistance. Specifically, a honeycomb structure is put into an electric furnace in which the temperature is raised to a predetermined temperature, and is heated for 1 hour. Thereafter, the honeycomb structure is taken out into a room maintained at 25° C., and naturally cooled by placing it on a wire mesh. Moreover, after the lapse of 15 minutes, the honeycomb structure is visually inspected, and it is defined as "pass" for the temperature as long as a crack cannot be confirmed. Thereafter, the temperature of the electric furnace is raised by 50° C., and the operations of heating and natural cooling described above are repeated until a crack is first confirmed (until it becomes fail) (ESP test). Then, a temperature finally determined as "pass" is defined as "ESP safe temperature". For example, a crack cannot be confirmed in an ESP test in which the temperature difference between room temperature (25° C.) and a temperature in the electric furnace is 400° C., then when a crack is confirmed in an ESP test in which the temperature difference is 450° C., the ESP safe temperature becomes 400° C.

(1-2) Honeycomb Structure Body:

The honeycomb structure body 10 has a porous partition wall 1 (see FIG. 2) which defines a plurality of cells 2 (see FIG. 2) serving as through channels of fluid and extending from an inflow end face 11 as one end face to an outflow end face 12 as the other end face, as described above.

The thickness of the partition wall 1 is preferably 64 to 135 µm, and particularly preferably 89 to 135 µm. When the thickness of the partition wall 1 is less than the above lower limit, the strength of the honeycomb structure 100 may be lowered. When the thickness of the partition wall 1 exceeds the above upper limit, the pressure loss may increase.

The cell density of the honeycomb structure body 10 is not particularly limited. The cell density of the honeycomb structure body 10 is preferably 46 to 186 cells/cm$^2$, and particularly preferably 62 to 116 cells/cm$^2$. When the cell density is less than the lower limit, the pressure loss may increase in a short time and the strength of the honeycomb structure 100 may be lowered, when circulating exhaust gas. When the cell density exceeds the upper limit, the pressure loss may increase.

The porosity of the partition wall 1 is preferably 25 to 55%, and particularly preferably 35 to 50%. By setting the porosity in the above range, the heat capacity of the partition wall is lowered. Thus, the temperature of the catalyst is likely to rise, and purification performance of the exhaust gas is improved. When the porosity of the partition wall is less than 25%, the heat capacity of the partition wall is increased. Thus, the temperature of the catalyst is unlikely to rise, and purification performance of the exhaust gas may be deteriorated. When the porosity exceeds 55%, the strength of the partition wall is lowered, and thus, the honeycomb structure may break when storing the honeycomb structure in a can body. The porosity is a value measured by a mercury porosimeter.

The average pore diameter of pores in the partition wall 1 is preferably 3 to 40 µm, and particularly preferably 5 to 25 µm. By setting the average pore diameter in the above range, the catalyst becomes easily filled in the partition wall of the honeycomb structure, and thus, purification performance of the exhaust gas is improved. When the average pore diameter is less than 3 µm, the catalyst is unlikely to infiltrate into the pore, and mainly loaded onto the surface (wall surface) of the partition wall, and thus, purification performance of the exhaust gas may be deteriorated. When the average pore diameter exceeds 40 µm, the strength is lowered, and thus, the honeycomb structure may break when storing the honeycomb structure in a can body. The average pore diameter is a value measured by a mercury porosimeter.

The cell shape (cell shape in the cross section perpendicular to the cell extending direction) of the honeycomb structure body 10 is not particularly limited. The cell shape includes a triangular shape, a quadrilateral shape, a hexagonal shape, an octagonal shape, and combinations of these shapes. Among quadrangles, square or rectangle is preferable.

The honeycomb structure body 10 can contain at least one selected from the group consisting of cordierite, silicon carbide, mullite, aluminum titanate and alumina, as a main component. Also, the honeycomb structure body 10 is preferably at least one selected from the group consisting of cordierite, silicon carbide, mullite, aluminum titanate and alumina. The "main component" herein means a component exceeding 50% by mass of the whole.

There is no particular restriction on the shape of the honeycomb structure body 10. The shape of the honeycomb structure body 10 is preferably a round pillar shape, a pillar shape with oval end faces, a pillar shape with end faces having a polygonal shape such as "a square shape, a rectangular shape, a triangular shape, a pentangular shape, a hexagonal shape or an octagonal shape" or the like. In the honeycomb structure 100 shown in FIG. 1, the shape of the honeycomb structure body 10 is a round pillar shape.

(2) Manufacturing Method of Honeycomb Structure:

The honeycomb structure of the present invention can be manufactured by the following method. That is, the honeycomb structure of the present invention can be manufactured by a method including a honeycomb fired body preparing step, a cutting step, a circumferential wall forming step, and a gap path forming step. The honeycomb fired body preparing step is a step of preparing a honeycomb fired body. The "honeycomb fired body" includes a porous partition wall which defines a plurality of cells serving as through channels of fluid and which is formed by firing the ceramic raw material. The cutting step is a step of cutting a circumferential part of the honeycomb fired body prepared in the honeycomb fired body preparing step to adjust the circumferential shape of the honeycomb fired body. The circumferential wall forming step is a step of applying a circumferential coating material to the circumference of the honeycomb fired body after the circumferential part of the honeycomb fired body is cut by the cutting step, and drying the circumferential coating material to obtain a honeycomb fired body having a circumferential wall in which a groove-shaped gap path with open surface is formed. The gap path forming step is a step of blocking the opening of the "groove-shaped gap path with open surface" of the honeycomb fired body having the groove with open surface, to form a gap path in the inner part.

Hereinafter, the manufacturing method of the honeycomb structure of the present invention will be described with respect to each step.

(2-1) Honeycomb Fired Body Preparing Step:

The honeycomb fired body preparing step is a step of preparing the honeycomb fired body including porous partition walls formed by firing the ceramic raw material. There is no particular restriction on the method of preparing the honeycomb fired body, and a conventionally known method can be adopted. This honeycomb fired body preparing step specifically includes a forming step and a firing step.

(2-1-1) Forming Step:

Firstly, in the forming step, a ceramic forming raw material containing the ceramic raw material is formed to obtain a honeycomb formed body including a partition wall defining a plurality of cells serving as through channels of fluid.

The ceramic raw material contained in the ceramic forming raw material is preferably at least one selected from the group consisting of a cordierite forming raw material, cordierite, silicon carbide, a silicon-silicon carbide composite material, mullite, and aluminum titanate. It is to be noted that the cordierite forming raw material is a ceramic raw material prepared so as to obtain a chemical composition falling in ranges of 42 to 56% by mass of silica, 30 to 45% by mass of alumina, and 12 to 16% by mass of magnesia. Moreover, the cordierite forming raw material is fired to become cordierite.

Moreover, the ceramic forming raw material can be prepared by mixing the above ceramic raw material with a dispersing medium, an organic binder, an inorganic binder, a pore former, a surfactant and the like. There is no particular restriction on a composition ratio of each raw material, and the composition ratio is preferably determined in accordance with a structure, a material and the like of the honeycomb structure to be prepared.

In the formation of the ceramic forming raw material, the ceramic forming raw material is first kneaded to obtain a kneaded material and then the obtained kneaded material is formed into a honeycomb shape. Examples of the method of kneading the ceramic forming raw material to form the kneaded material include methods using a kneader, a vacuum pugmill or the like. As the method of forming the kneaded material to obtain the honeycomb formed body, for example, known forming methods such as extrusion forming or injection molding can be used. As the method of forming the kneaded material to obtain the honeycomb formed body, specifically, a preferable example of the method is that the honeycomb formed body is formed by performing the extrusion forming with a use of a die having a desirable cell shape, partition wall thickness and cell density. A material of the die is preferably cemented carbide which does not easily wear out.

Examples of a shape of the honeycomb formed body include a round pillar shape, a pillar shape whose end face has an oval shape, and a polygonal pillar shape with end faces having "a square shape, a rectangular shape, a triangular shape, a pentangular shape, a hexagonal shape or an octagonal shape".

Moreover, after the above formation, the obtained honeycomb formed body may be dried. There is no particular restriction on a drying method. Examples of the drying method include hot air drying, microwave drying, dielectric drying, reduced pressure drying, vacuum drying, freeze drying, and the like. Among these methods, the dielectric drying, the microwave drying, the hot air drying or combination thereof is preferably performed.

(2-1-2) Firing Step:

Next, the honeycomb formed body is fired to prepare a honeycomb fired body. The firing (main firing) of the honeycomb formed body is performed for the purpose of sintering and densifying the forming raw material constituting the calcinated honeycomb formed body to acquire a predetermined strength. Firing conditions (temperature, time, atmosphere, and the like) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from 4 to 8 hours. As a device for performing the calcinating and main firing, an electric furnace, a gas furnace or the like can be used.

(2-2) Cutting Step:

The cutting step is a step of cutting a circumferential part of the honeycomb fired body. The method of cutting the honeycomb fired body can properly adopt a conventionally known method. For example, a method of pressing a diamond-coated grinding wheel while rotating the honeycomb fired body can be suitably adopted.

The cutting may be performed either before or after firing the honeycomb formed body, and is preferably performed after firing. By cutting after firing, it becomes possible to arrange the shape of the honeycomb fired body by cutting even when the honeycomb fired body is deformed by firing.

(2-3) Circumferential Wall Forming Step:

In this step, a circumferential coating material is applied to the circumference of the honeycomb fired body after the circumferential part of the honeycomb fired body is cut by the cutting step, and then is dried to obtain a honeycomb fired body having a circumferential wall in which a groove-shaped gap path with open surface is formed. By forming the circumferential wall, the honeycomb structure can be prevented from chipping when an external force is applied to the honeycomb structure.

The circumferential coating material includes those obtained by adding an additive such as an organic binder, foamable resin and a dispersing agent to an inorganic raw material such as an inorganic fiber, colloidal silica, clay and SiC particles, further adding water thereto and kneading the materials, and the like. The method of applying a circumferential coating material includes a method of coating the "cut honeycomb fired body" with a use of rubber spatula or the like while rotating the fired body on a potter's wheel, and the like.

The method of drying the circumferential coating material is not particularly limited as long as a groove-shaped gap path with open surface is generated on the circumferential wall to be obtained. For example, a method of putting the "honeycomb fired body applied with a circumferential coating material" at ambient temperature (25° C.) in a drier heated to 100 to 150° C. to rapidly heat and dry the circumferential coating material can be adopted.

The coating thickness of the circumferential coating material is not particularly limited as long as the desired thickness of the circumferential wall is obtained, but can be set to 0.5 to 4.0 mm.

(2-4) Gap Path Forming Step:

In this step, a predetermined gap path is formed in the inner part of the circumferential wall while blocking the opening of the grooved honeycomb fired body with a groove-shaped gap path with open surface obtained in the circumferential wall forming step.

In the formation of a gap path, the circumferential coating material described above can be used, and the opening of a groove-shaped gap path with open surface can be blocked such that the circumferential coating material is applied into the groove-shaped gap path with open surface. Thereafter, the circumferential coating material applied into the groove-shaped gap path with open surface is dried, whereby a honeycomb structure having a gap path inside the circumferential wall can be obtained. Attention is paid so that the circumferential wall is hollow. That is, the groove-shaped gap path with open surface should not be completely blocked.

(2-5) Other method:

In the above method, the groove-shaped gap path with open surface is formed in the circumferential wall by the circumferential wall forming step, then the opening of a groove-shaped gap path with open surface is blocked to form a gap path by the gap path forming step. On the other hand, a gap path may be formed by other method. For example, a substance (spacer) that is to disappear when heated is previously arranged on the circumferential surface of the honeycomb fired body, and then a circumferential coating material is applied. Thereafter, the circumferential coating material is heated to be dried, which also causes the spacer to disappear, whereby a predetermined gap path can be formed inside the circumferential wall.

A spacer that does not have fluidity at room temperature is preferable, and a spacer that comes to have fluidity at a relatively low temperature, for example, a temperature of 45° C. or more, is preferable. Specific examples of the spacer include fatty acids such as paraffin wax, wax and stearic acid, acid amides such as stearic acid amide, esters such as butyl stearate, and the like. Also, as the spacer, materials which scatter and disappear at a higher temperature, for example, a temperature of about 300 to 400° C., can be also preferably used. Polymer materials such as plastic that decompose and disappear at the above temperature can be also preferably used.

EXAMPLES

Hereinafter, the present invention will further specifically be described based on examples. The present invention is not limited to these examples.

Example 1

First, using a forming raw material containing a ceramic raw material, a kneaded material for forming a honeycomb formed body was prepared. A cordierite forming raw material was used as a ceramic raw material. A dispersing medium, an organic binder, a dispersing agent and a pore former were added to a cordierite forming raw material to prepare a kneaded material for forming. The addition amount of the dispersing medium was 50 parts by mass based on 100 parts by mass of the cordierite forming raw material. The addition amount of the organic binder was 5 parts by mass based on 100 parts by mass of the cordierite forming raw material. The addition amount of the pore former was 5 parts by mass based on 100 parts by mass of the cordierite forming raw material. The resulting ceramic forming raw material was kneaded using a kneader to obtain a kneaded material.

Subsequently, the resulting kneaded material was extruded using a vacuum extrusion molding machine to obtain a quadrangular pillar-shaped honeycomb formed body.

Next, the obtained honeycomb formed body was dried by high frequency dielectric heating and then dried at 120° C. for 2 hours by use of a hot-air drying machine. Thereafter, the honeycomb formed body was fired at 1400° C. for 8 hours to obtain a quadrangular pillar-shaped honeycomb fired body. Then, the circumferential part of the obtained honeycomb fired body was cut to obtain a round pillar-shaped honeycomb fired body.

Subsequently, a circumferential coating material was applied to the circumferential surface of the obtained round pillar-shaped honeycomb fired body, and then this circumferential coating material was dried. By drying the circumferential coating material rapidly, the "groove-shaped gap path with open surface" was formed on the obtained circumferential coating layer. A honeycomb fired body was obtained as described above. As the conditions for drying the circumferential coating material, the following conditions were adopted. Specifically, firstly, the circumferential coating material was heated at 130° C. for 0.5 hours, and then retained at 25° C. for 1 hour.

Next, a circumferential coating material was applied so as to form a gap path without blocking the inner part, while blocking the opening of the "groove-shaped gap path with open surface" formed on the circumferential coating layer of the obtained honeycomb fired body. Then, the circumferential coating material was retained at 25° C. for 24 hours. A honeycomb structure having a circumferential wall was prepared as described above.

A cross section of the obtained honeycomb structure perpendicular to the cell extending direction had a round shape with a diameter of 330.2 mm. Also, the honeycomb structure had a length in the cell extending direction of 203.2 mm. Moreover, the honeycomb structure had a thickness of the partition wall of 0.089 mm and a cell density of 116 cells/cm². In addition, the porosity of the partition wall of the honeycomb structure was 50%. The average pore diameter of pores in the partition wall of the honeycomb structure was 20 μm. Also, each measurement value of the honeycomb structure is shown in Table 1.

TABLE 1

|  | Partition wall thickness (mm) | Cell density (cells/cm²) | Porosity (%) | Average pore diameter (μm) | Diameter (mm) | Length (mm) |
| --- | --- | --- | --- | --- | --- | --- |
| Comparative Example 1 | 0.064 | 139 | 29 | 5 | 143.8 | 152.4 |
| Comparative Example 2 | 0.064 | 186 | 29 | 5 | 143.8 | 152.4 |
| Comparative Example 3 | 0.135 | 46 | 35 | 5 | 330.2 | 203.2 |
| Comparative Example 4 | 0.114 | 62 | 35 | 5 | 330.2 | 203.2 |
| Comparative Example 5 | 0.089 | 62 | 35 | 5 | 330.2 | 203.2 |
| Comparative Example 6 | 0.14 | 46 | 50 | 20 | 330.2 | 203.2 |
| Comparative Example 7 | 0.114 | 62 | 50 | 20 | 330.2 | 203.2 |
| Comparative Example 8 | 0.089 | 116 | 50 | 20 | 330.2 | 203.2 |
| Example 1 | 0.089 | 116 | 50 | 20 | 330.2 | 203.2 |
| Example 2 | 0.089 | 116 | 50 | 20 | 330.2 | 203.2 |
| Example 3 | 0.089 | 116 | 50 | 20 | 330.2 | 203.2 |
| Example 4 | 0.089 | 116 | 50 | 20 | 330.2 | 203.2 |
| Example 5 | 0.064 | 139 | 29 | 5 | 143.8 | 152.4 |
| Example 6 | 0.064 | 186 | 29 | 5 | 143.8 | 152.4 |
| Example 7 | 0.135 | 46 | 35 | 5 | 330.2 | 203.2 |
| Example 8 | 0.114 | 62 | 35 | 5 | 330.2 | 203.2 |
| Example 9 | 0.089 | 62 | 35 | 5 | 330.2 | 203.2 |

TABLE 1-continued

|  | Partition wall thickness (mm) | Cell density (cells/cm²) | Porosity (%) | Average pore diameter (μm) | Diameter (mm) | Length (mm) |
| --- | --- | --- | --- | --- | --- | --- |
| Example 10 | 0.14 | 46 | 50 | 20 | 330.2 | 203.2 |
| Example 11 | 0.114 | 62 | 50 | 20 | 330.2 | 203.2 |
| Example 12 | 0.089 | 116 | 50 | 20 | 330.2 | 203.2 |
| Example 13 | 0.089 | 116 | 50 | 20 | 330.2 | 203.2 |
| Example 14 | 0.089 | 116 | 50 | 20 | 330.2 | 203.2 |
| Example 15 | 0.089 | 116 | 50 | 20 | 330.2 | 203.2 |
| Example 16 | 0.089 | 116 | 50 | 20 | 330.2 | 203.2 |
| Example 17 | 0.089 | 116 | 50 | 20 | 330.2 | 203.2 |
| Example 18 | 0.089 | 116 | 50 | 20 | 330.2 | 203.2 |
| Example 19 | 0.089 | 116 | 50 | 20 | 330.2 | 203.2 |

TABLE 2

|  | Partition wall thickness (mm) | Cell density (cells/cm²) | Porosity (%) | Average pore diameter (μm) | Diameter (mm) | Length (mm) |
| --- | --- | --- | --- | --- | --- | --- |
| Comparative Example 9 | 0.064 | 139 | 29 | 5 | 143.8 | 152.4 |
| Comparative Example 10 | 0.064 | 186 | 29 | 5 | 143.8 | 152.4 |
| Comparative Example 11 | 0.135 | 46 | 35 | 5 | 330.2 | 203.2 |
| Comparative Example 12 | 0.114 | 62 | 35 | 5 | 330.2 | 203.2 |
| Comparative Example 13 | 0.089 | 62 | 35 | 5 | 330.2 | 203.2 |
| Comparative Example 14 | 0.14 | 46 | 50 | 20 | 330.2 | 203.2 |
| Comparative Example 15 | 0.114 | 62 | 50 | 20 | 330.2 | 203.2 |
| Comparative Example 16 | 0.089 | 116 | 50 | 20 | 330.2 | 203.2 |
| Comparative Example 17 | 0.064 | 139 | 29 | 5 | 143.8 | 152.4 |
| Comparative Example 18 | 0.064 | 186 | 29 | 5 | 143.8 | 152.4 |
| Comparative Example 19 | 0.135 | 46 | 35 | 5 | 330.2 | 203.2 |
| Comparative Example 20 | 0.114 | 62 | 35 | 5 | 330.2 | 203.2 |
| Comparative Example 21 | 0.089 | 62 | 35 | 5 | 330.2 | 203.2 |
| Comparative Example 22 | 0.14 | 46 | 50 | 20 | 330.2 | 203.2 |
| Comparative Example 23 | 0.114 | 62 | 50 | 20 | 330.2 | 203.2 |
| Comparative Example 24 | 0.089 | 116 | 50 | 20 | 330.2 | 203.2 |
| Comparative Example 25 | 0.064 | 139 | 29 | 5 | 143.8 | 152.4 |
| Comparative Example 26 | 0.064 | 186 | 29 | 5 | 143.8 | 152.4 |
| Comparative Example 27 | 0.135 | 46 | 35 | 5 | 330.2 | 203.2 |
| Comparative Example 28 | 0.114 | 62 | 35 | 5 | 330.2 | 203.2 |
| Comparative Example 29 | 0.089 | 62 | 35 | 5 | 330.2 | 203.2 |
| Comparative Example 30 | 0.14 | 46 | 50 | 20 | 330.2 | 203.2 |
| Comparative Example 31 | 0.114 | 62 | 50 | 20 | 330.2 | 203.2 |
| Comparative Example 32 | 0.089 | 116 | 50 | 20 | 330.2 | 203.2 |
| Comparative Example 33 | 0.064 | 139 | 29 | 5 | 143.8 | 152.4 |
| Comparative Example 34 | 0.064 | 186 | 29 | 5 | 143.8 | 152.4 |
| Comparative Example 35 | 0.135 | 46 | 35 | 5 | 330.2 | 203.2 |
| Comparative Example 36 | 0.114 | 62 | 35 | 5 | 330.2 | 203.2 |
| Comparative Example 37 | 0.089 | 62 | 35 | 5 | 330.2 | 203.2 |
| Comparative Example 38 | 0.14 | 46 | 50 | 20 | 330.2 | 203.2 |
| Comparative Example 39 | 0.114 | 62 | 50 | 20 | 330.2 | 203.2 |
| Comparative Example 40 | 0.089 | 116 | 50 | 20 | 330.2 | 203.2 |
| Comparative Example 41 | 0.064 | 139 | 29 | 5 | 143.8 | 152.4 |
| Comparative Example 42 | 0.064 | 186 | 29 | 5 | 143.8 | 152.4 |
| Comparative Example 43 | 0.135 | 46 | 35 | 5 | 330.2 | 203.2 |
| Comparative Example 44 | 0.114 | 62 | 35 | 5 | 330.2 | 203.2 |
| Comparative Example 45 | 0.089 | 62 | 35 | 5 | 330.2 | 203.2 |
| Comparative Example 46 | 0.14 | 46 | 50 | 20 | 330.2 | 203.2 |
| Comparative Example 47 | 0.114 | 62 | 50 | 20 | 330.2 | 203.2 |
| Comparative Example 48 | 0.089 | 116 | 50 | 20 | 330.2 | 203.2 |
| Comparative Example 49 | 0.064 | 139 | 29 | 5 | 143.8 | 152.4 |
| Comparative Example 50 | 0.064 | 186 | 29 | 5 | 143.8 | 152.4 |
| Comparative Example 51 | 0.135 | 46 | 35 | 5 | 330.2 | 203.2 |
| Comparative Example 52 | 0.114 | 62 | 35 | 5 | 330.2 | 203.2 |
| Comparative Example 53 | 0.089 | 62 | 35 | 5 | 330.2 | 203.2 |
| Comparative Example 54 | 0.14 | 46 | 50 | 20 | 330.2 | 203.2 |
| Comparative Example 55 | 0.114 | 62 | 50 | 20 | 330.2 | 203.2 |
| Comparative Example 56 | 0.089 | 116 | 50 | 20 | 330.2 | 203.2 |
| Comparative Example 57 | 0.064 | 139 | 29 | 5 | 143.8 | 152.4 |
| Comparative Example 58 | 0.064 | 186 | 29 | 5 | 143.8 | 152.4 |
| Comparative Example 59 | 0.135 | 46 | 35 | 5 | 330.2 | 203.2 |
| Comparative Example 60 | 0.114 | 62 | 35 | 5 | 330.2 | 203.2 |
| Comparative Example 61 | 0.089 | 62 | 35 | 5 | 330.2 | 203.2 |
| Comparative Example 62 | 0.14 | 46 | 50 | 20 | 330.2 | 203.2 |

TABLE 2-continued

|  | Partition wall thickness (mm) | Cell density (cells/cm²) | Porosity (%) | Average pore diameter (μm) | Diameter (mm) | Length (mm) |
|---|---|---|---|---|---|---|
| Comparative Example 63 | 0.114 | 62 | 50 | 20 | 330.2 | 203.2 |
| Comparative Example 64 | 0.089 | 116 | 50 | 20 | 330.2 | 203.2 |

Furthermore, the gap path in the obtained honeycomb structure had a height of 50% of the thickness of the circumferential wall and a width W of 1.0 mm. Also, a total length of the gap path was 1500% of a length in the cell extending direction of the honeycomb structure body. The thickness T of the circumferential wall was 1.8 mm. The result is shown in Table 3.

Here, the part of the thickness of 5% of the thickness of the circumferential wall was uniformly cut from a surface of the circumferential wall, then a groove on the surface exposed by the cutting was confirmed, and the width and height of this groove at the predetermined position were measured, and defined as the width and height of the gap path. The "predetermined position" was determined as follows. Four straight lines (parallel straight lines) that are parallel to the partition wall extending direction and pass through the center of the end face and the edge of the end face in the plane view of the end face of the honeycomb structure are drawn, and four contacts (reference points) of the parallel straight lines and the edge of the end face are determined. Moreover, straight lines (standing straight lines L) are each drawn in the cell extending direction, from these reference points toward the other end face of the honeycomb structure. Then, the width and height of the gap path (groove) positioned at "three predetermined points" on the standing straight lines are measured, and the averages of these are calculated. The height and width of the gap path were determined as described above. The "three predetermined points" on the standing straight lines refer to a point on the inflow end face of the honeycomb structure, a point on the outflow end face of the honeycomb structure, and an intermediate point of the inflow end face and the outflow end face of the honeycomb structure.

As the total length of the gap path, the part of the thickness of 5% of the thickness of the circumferential wall was cut from a surface of the circumferential wall, then the total length of the groove on the surface exposed by the cutting was measured.

As to the obtained honeycomb structure, evaluation of "ESP safe temperature" and "isostatic strength" were each conducted by the methods shown below. The result is shown in Table 3.

(ESP Safe Temperature)

ESP safe temperature was measured as follows. First, a honeycomb structure was put into an electric furnace in which a difference from room temperature (25° C.) was 300° C. (temperature in the electric furnace is 325° C.), and was heated for 1 hour. Next, the honeycomb structure was taken out from the electric furnace, and naturally cooled on a wire mesh at ambient temperature for 15 minutes. Thereafter, the presence or absence of a crack was visually observed. Then, when a crack could not be confirmed was determined as pass, and the temperature of the electric furnace was raised by 50° C., then the operations of heating and natural cooling were again performed (ESP test was performed). The temperature of the electric furnace was raised by 50° C. until a crack was confirmed (until it became fail), and the operations of heating and natural cooling were repeated. Then, a temperature of the electric furnace finally determined as pass was defined as ESP safe temperature (° C.).

Thereafter, based on the obtained ESP safe temperature, the evaluation was conducted according to the following standard. It is defined as "D" when the ESP safe temperature is less than 450° C. It is defined as "C" when the ESP safe temperature is 450° C. or more and less than 550° C. It is defined as "B" when the ESP safe temperature is 550° C. or more and less than 650° C. It is defined as "A" when the ESP safe temperature is 650° C. or more.

(Isostatic Strength)

The isostatic strength was measured on the basis of an isostatic breaking strength test stipulated in car standard (JASO standard) M505-87 issued by Society of Automotive Engineers of Japan. The isostatic breaking strength test is a test in which a honeycomb structure is disposed in a rubber columnar container and the container is closed with a lid of a plate made of aluminum, to carry out isotropic pressurizing compression in water.

That is, the isostatic breaking strength test is a test to simulate a compressive load application in a case where a circumferential surface of the honeycomb structure is held by a can body. The isostatic strength measured by the isostatic breaking strength test is indicated by an applied pressure value (MPa) when the honeycomb structure breaks.

A case where the isostatic strength is 1.0 MPa or more is defined as "OK" (pass), and a case where the isostatic strength is less than 1.0 MPa is "NG" (fail).

TABLE 3

|  | Gap path | | | Thickness T of circumferential wall (mm) | ESP safe temperature | | Isostatic strength | |
|---|---|---|---|---|---|---|---|---|
|  | Height D (%) | Width W (mm) | Total Length (%) | | (° C.) | Evaluation | (MPa) | Evaluation |
| Comparative Example 1 | 0 | 0 | 0 | 1.5 | 350 | D | 1.5 | OK |
| Comparative Example 2 | 0 | 0 | 0 | 1.4 | 350 | D | 1.2 | OK |
| Comparative Example 3 | 0 | 0 | 0 | 1.4 | 450 | C | 5 | OK |
| Comparative Example 4 | 0 | 0 | 0 | 1.5 | 450 | C | 4 | OK |
| Comparative Example 5 | 0 | 0 | 0 | 1.4 | 400 | D | 2 | OK |
| Comparative Example 6 | 0 | 0 | 0 | 1.5 | 400 | D | 1.5 | OK |

TABLE 3-continued

|  | Gap path | | | Thickness T of circumferential wall | ESP safe temperature | | Isostatic strength | |
|---|---|---|---|---|---|---|---|---|
|  | Height D (%) | Width W (mm) | Total Length (%) | (mm) | (°C.) | Evaluation | (MPa) | Evaluation |
| Comparative Example 7 | 0 | 0 | 0 | 1.5 | 350 | D | 1.4 | OK |
| Comparative Example 8 | 0 | 0 | 0 | 1.5 | 300 | D | 1.2 | OK |
| Example 1 | 50 | 1.0 | 1500 | 1.8 | 550 | B | 1.2 | OK |
| Example 2 | 55 | 0.4 | 1600 | 1.6 | 550 | B | 1.2 | OK |
| Example 3 | 60 | 1.0 | 1000 | 1.5 | 550 | B | 1.2 | OK |
| Example 4 | 50 | 1.0 | 1500 | 0.5 | 550 | B | 1.2 | OK |
| Example 5 | 50 | 1.0 | 1500 | 1.8 | 550 | B | 1.5 | OK |
| Example 6 | 60 | 1.3 | 1800 | 1.9 | 550 | B | 1.2 | OK |
| Example 7 | 55 | 1.4 | 1600 | 1.8 | 750 | A | 5 | OK |
| Example 8 | 55 | 0.9 | 1700 | 2.0 | 750 | A | 4 | OK |
| Example 9 | 60 | 0.7 | 1500 | 2.1 | 700 | A | 2 | OK |
| Example 10 | 65 | 0.8 | 1200 | 2 | 650 | A | 1.5 | OK |
| Example 11 | 75 | 0.7 | 1100 | 1.9 | 600 | B | 1.4 | OK |
| Example 12 | 55 | 1.0 | 1400 | 2 | 600 | B | 1.2 | OK |
| Example 13 | 75 | 0.6 | 1400 | 1.8 | 550 | B | 1.2 | OK |
| Example 14 | 80 | 0.7 | 1300 | 1.8 | 550 | B | 1.2 | OK |
| Example 15 | 99 | 0.5 | 1600 | 2 | 550 | B | 1.2 | OK |
| Example 16 | 55 | 3.9 | 2000 | 2 | 550 | B | 1.2 | OK |
| Example 17 | 82 | 2 | 1900 | 3 | 550 | B | 1.2 | OK |
| Example 18 | 78 | 1.8 | 1600 | 3.1 | 550 | B | 1.2 | OK |
| Example 19 | 60 | 1 | 2200 | 3.8 | 550 | B | 1.2 | OK |

TABLE 4

|  | Gap path | | | Thickness T of circumferential wall | ESP safe temperature | | Isostatic strength | |
|---|---|---|---|---|---|---|---|---|
|  | Height D (%) | Width W (mm) | Total Length (%) | (mm) | (°C.) | Evaluation | (MPa) | Evaluation |
| Comparative Example 9 | 45 | 0.5 | 1500 | 1.5 | 350 | D | 1.5 | OK |
| Comparative Example 10 | 40 | 0.6 | 1800 | 1.4 | 350 | D | 1.2 | OK |
| Comparative Example 11 | 35 | 0.5 | 1600 | 1.4 | 450 | C | 5 | OK |
| Comparative Example 12 | 42 | 0.5 | 1700 | 1.5 | 450 | C | 4 | OK |
| Comparative Example 13 | 35 | 0.6 | 1300 | 1.4 | 400 | D | 2 | OK |
| Comparative Example 14 | 45 | 0.5 | 1200 | 1.5 | 400 | D | 1.5 | OK |
| Comparative Example 15 | 40 | 0.5 | 1800 | 1.5 | 350 | D | 1.4 | OK |
| Comparative Example 16 | 47 | 0.6 | 1400 | 1.5 | 300 | D | 1.2 | OK |
| Comparative Example 17 | 100 | 0.5 | 1500 | 1.5 | 350 | D | 0.4 | NG |
| Comparative Example 18 | 100 | 0.6 | 1800 | 1.4 | 350 | D | 0.4 | NG |
| Comparative Example 19 | 100 | 0.5 | 1600 | 1.4 | 450 | C | 0.7 | NG |
| Comparative Example 20 | 100 | 0.5 | 1700 | 1.5 | 450 | C | 0.7 | NG |
| Comparative Example 21 | 100 | 0.6 | 1300 | 1.4 | 400 | D | 0.6 | NG |
| Comparative Example 22 | 100 | 0.5 | 1200 | 1.5 | 400 | D | 0.6 | NG |
| Comparative Example 23 | 100 | 0.5 | 1800 | 1.5 | 350 | D | 0.5 | NG |
| Comparative Example 24 | 100 | 0.6 | 1400 | 1.5 | 300 | D | 0.3 | NG |
| Comparative Example 25 | 80 | 0.1 | 1600 | 1.5 | 350 | D | 1.5 | OK |
| Comparative Example 26 | 75 | 0.3 | 1900 | 1.4 | 350 | D | 1.2 | OK |
| Comparative Example 27 | 70 | 0.1 | 2200 | 1.4 | 450 | C | 5 | OK |
| Comparative Example 28 | 80 | 0.1 | 1600 | 1.5 | 450 | C | 4 | OK |
| Comparative Example 29 | 78 | 0.2 | 1500 | 1.4 | 400 | D | 2 | OK |
| Comparative Example 30 | 80 | 0.2 | 1300 | 1.5 | 400 | D | 1.5 | OK |
| Comparative Example 31 | 75 | 0.2 | 1100 | 1.5 | 350 | D | 1.4 | OK |
| Comparative Example 32 | 75 | 0.3 | 1700 | 1.5 | 300 | D | 1.2 | OK |
| Comparative Example 33 | 80 | 4.3 | 1500 | 1.5 | 350 | D | 0.5 | NG |
| Comparative Example 34 | 75 | 4.5 | 1800 | 1.4 | 350 | D | 0.5 | NG |
| Comparative Example 35 | 70 | 4.2 | 1500 | 1.4 | 450 | C | 0.6 | NG |
| Comparative Example 36 | 80 | 4.5 | 1700 | 1.5 | 450 | C | 0.7 | NG |
| Comparative Example 37 | 78 | 5.0 | 1600 | 1.4 | 400 | D | 0.6 | NG |
| Comparative Example 38 | 80 | 4.8 | 1200 | 1.5 | 400 | D | 0.6 | NG |
| Comparative Example 39 | 75 | 5.2 | 1200 | 1.5 | 350 | D | 0.5 | NG |
| Comparative Example 40 | 75 | 4.1 | 1400 | 1.5 | 300 | D | 0.3 | NG |
| Comparative Example 41 | 80 | 0.1 | 700 | 1.5 | 350 | D | 1.5 | OK |
| Comparative Example 42 | 75 | 0.2 | 600 | 1.4 | 350 | D | 1.2 | OK |
| Comparative Example 43 | 70 | 0.1 | 900 | 1.4 | 450 | C | 5 | OK |
| Comparative Example 44 | 80 | 0.1 | 700 | 1.5 | 450 | C | 4 | OK |
| Comparative Example 45 | 78 | 0.2 | 600 | 1.4 | 400 | D | 2 | OK |
| Comparative Example 46 | 80 | 0.2 | 950 | 1.5 | 400 | D | 1.5 | OK |
| Comparative Example 47 | 75 | 0.2 | 800 | 1.5 | 350 | D | 1.4 | OK |

TABLE 4-continued

|  | Gap path | | | Thickness T of circumferential wall (mm) | ESP safe temperature | | Isostatic strength | |
| --- | --- | --- | --- | --- | --- | --- | --- | --- |
|  | Height D (%) | Width W (mm) | Total Length (%) | | (° C.) | Evaluation | (MPa) | Evaluation |
| Comparative Example 48 | 75 | 0.1 | 980 | 1.5 | 300 | D | 1.1 | OK |
| Comparative Example 49 | 80 | 0.1 | 1500 | 4.3 | 350 | D | 1.5 | OK |
| Comparative Example 50 | 75 | 0.2 | 1400 | 4.2 | 350 | D | 1.2 | OK |
| Comparative Example 51 | 70 | 0.1 | 1600 | 4.3 | 450 | C | 5 | OK |
| Comparative Example 52 | 80 | 0.1 | 1300 | 4.1 | 450 | C | 4 | OK |
| Comparative Example 53 | 78 | 0.2 | 1500 | 4.5 | 400 | D | 2 | OK |
| Comparative Example 54 | 80 | 0.2 | 1600 | 4.2 | 400 | D | 1.5 | OK |
| Comparative Example 55 | 75 | 0.2 | 1500 | 4.3 | 350 | D | 1.4 | OK |
| Comparative Example 56 | 75 | 0.1 | 1400 | 4.2 | 300 | D | 1.3 | OK |
| Comparative Example 57 | 80 | 0.5 | 1700 | 0.3 | 550 | B | 0.4 | NG |
| Comparative Example 58 | 80 | 0.6 | 1600 | 0.4 | 550 | B | 0.4 | NG |
| Comparative Example 59 | 85 | 0.5 | 1300 | 0.3 | 750 | A | 0.7 | NG |
| Comparative Example 60 | 80 | 0.5 | 1500 | 0.3 | 750 | A | 0.7 | NG |
| Comparative Example 61 | 80 | 0.6 | 1800 | 0.4 | 700 | B | 0.6 | NG |
| Comparative Example 62 | 85 | 0.5 | 1300 | 0.4 | 650 | A | 0.6 | NG |
| Comparative Example 63 | 80 | 0.5 | 1100 | 0.4 | 600 | B | 0.5 | NG |
| Comparative Example 64 | 75 | 0.5 | 1400 | 0.3 | 600 | B | 0.3 | NG |

Examples 2 to 19, Comparative Examples 1 to 64

Honeycomb structures were obtained in the same manner as in Example 1, except for changing the conditions as shown in Table 1 and Table 2. Gap paths were formed by changing height, width and total length, according to change of drying conditions of the circumferential wall, and arrangement of a spacer that is to disappear by heating. As a spacer, a paraffin wax that is pyrolyzed and burns by heat treatment at 400° C. was used. Measurement results of the obtained honeycomb structures are shown in Table 1 and Table 2. Moreover, as to the honeycomb structures, evaluation of "ESP safe temperature" and "isostatic strength" were each conducted. The results are shown in Table 3 and Table 4. Here, a spacer was used in Examples 1 to 3, and 15 to 16, and Comparative Examples 25 to 56.

It can be seen from Table 3 and Table 4 that a crack is hardly generated in the honeycomb structures of Examples 1 to 19, as compared to the honeycomb structures of Comparative Examples 1 to 64.

INDUSTRIAL APPLICABILITY

The honeycomb structure of the present invention can be suitably used as a filter for purifying exhaust gas from automobiles and the like.

DESCRIPTION OF REFERENCE NUMERALS

1: Partition wall, 2: Cell, 10: Honeycomb structure body, 11: Inflow end face, 12: Outflow end face, 20: Circumferential wall, 21: Surface of circumferential wall, 30: Gap path, 100: Honeycomb structure, C1: Counterclockwise, C2: Clockwise, D: Height of gap path, H: Normal line, L: Standing straight line, T: Thickness of circumferential wall, W: Width of gap path.

What is claimed is:

1. A honeycomb structure comprising:
    a honeycomb structure body that includes a porous partition wall which defines a plurality of cells serving as through channels of fluid and extending from an inflow end face as one end face to an outflow end face as the other end face, and
    a circumferential wall arranged on a circumferential surface of the honeycomb structure body, wherein
    the circumferential wall has a thickness of 0.5 to 4.0 mm,
    a gap path is formed along a surface of the circumferential wall inside the circumferential wall,
    the gap path has a width of 0.4 to 4.0 mm, and has a height of 50 to 99% of the thickness of the circumferential wall, and
    a total length of the gap path is 1000% or more of a length in the cell extending direction of the honeycomb structure body.

2. The honeycomb structure according to claim 1, wherein the circumferential wall has a thickness of 0.5 to 3.0 mm, and the gap path has a height of 80 to 99% of the thickness of the circumferential wall.

* * * * *